United States Patent Office 3,301,576
Patented Jan. 31, 1967

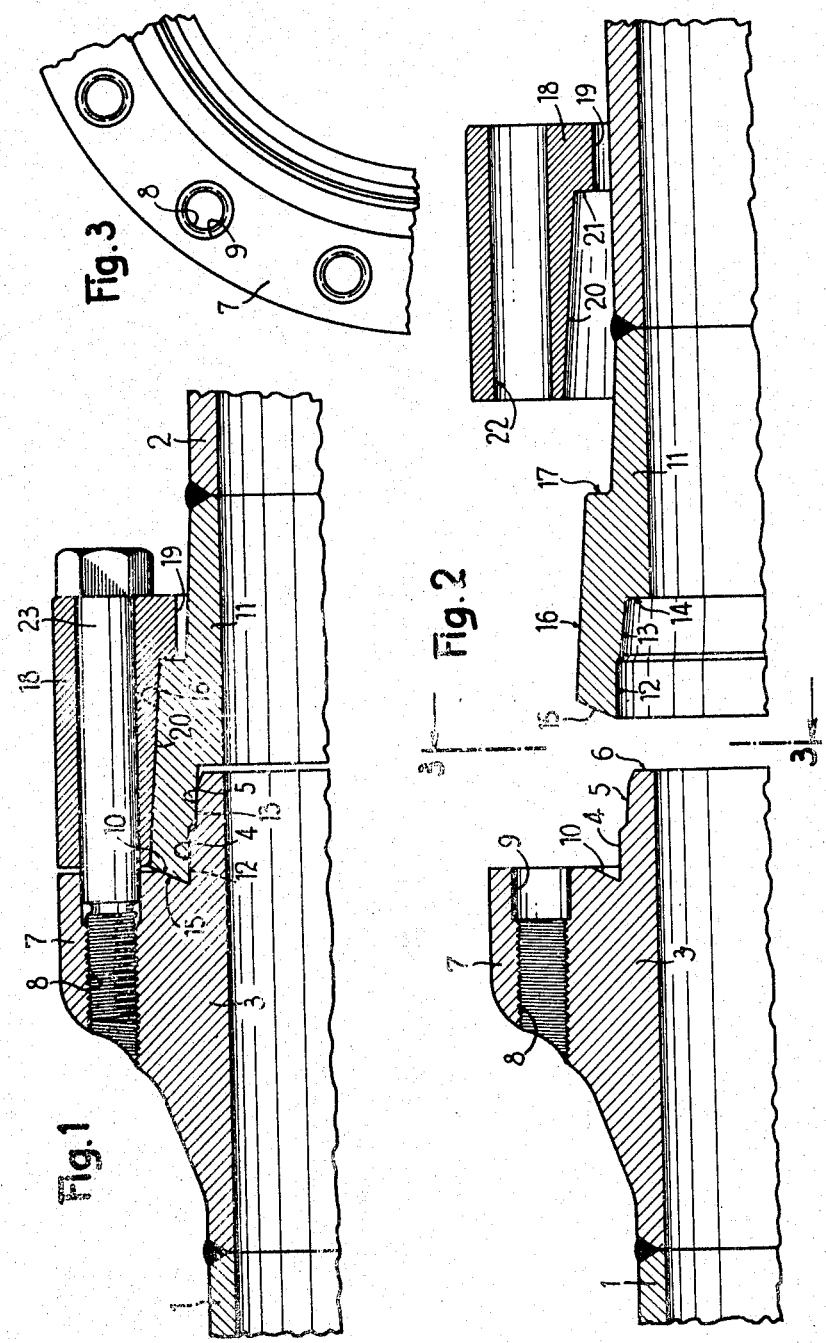

3,301,576
FLANGED JOINT
Pierre Paul Camille Vigneron, Pont-a-Mousson, France, assignor to Centre de Recherches de Pont-a-Mousson, Pont-a-Mousson, France, a French body corporate
Filed Nov. 23, 1964, Ser. No. 413,087
Claims priority, application France, Dec. 4, 1963, 956,006
6 Claims. (Cl. 285—24)

The present invention relates to an improved flanged joint for pipe elements, in particular of steel, adapted to withstand high internal and external pressures, of the order of several hundred bars, and bending stresses.

This joint is more particularly intended for the connection of pipe elements or sections each of which is composed of several interconnected tubes so that said sections cannot be rotated with respect to each other owing to their length and weight.

The improved joint according to the invention is of the type comprising, at one end of one of the pipe elements to be interconnected, a fixed flange in the peripheral marginal portion of which are provided tapped apertures and, at the adjacent end of the other element, a ring which is free to move axially and to rotate relative to the corresponding end and is provided with smooth apertures through which extend screws adapted to be screwed in the tapped apertures of the fixed flange, said ends of the two elements having respectively male and female portions fitted one inside the other, each portion comprising a cylindrical centering face, adjoining a frusto-conical joint face and the free ring bearing against the female portion by a frusto-conical wedging face.

Further features and advantages of the invention will be apparent from the ensuing description with reference to the accompanying drawings to which the invention is in no way limited.

In the drawings:

FIG. 1 is a partial axial radial sectional view of an assembled joint according to the invention;

FIG. 2 is a similar view of the two ends of the pipe sections before assembly, and FIG. 3 is a partial sectional view taken along line 3—3 of FIG. 2.

In the illustrated embodiment, the joint according to the invention relates to the connection of two tubular steel elements or sections 1 and 2.

Welded to one end of the element 1 is an annular end member or male end portion 3 whose wall thickness in the region of the connection thereof to the element 1 is equal to the wall thickness of the latter. This member terminates in a cylindrical bearing face 4 adjoining a frusto-conical bearing face 5 which terminates in an end face 6 contained in a plane perpendicular to the axis of the element.

The member 3 is thicker in its middle part so as to form a flange 7 which is provided with a number of tapped apertures 8, each having a counterbore 9, these apertures being evenly spaced apart circumferentially of the flange (FIG. 3).

The end face of this flange, which is perpendicular to the axis of the element 1, has in the region of the apertures a frustoconical re-entrant annular face or recess 10 connected to the cylindrical bearing face 4.

The end of the tubular element 2 is welded to a second annular end member or female portion 11 whose wall thickness in the region of the connection thereof to the element 2 is equal to the wall thickness of the latter. This member forms at its free end or entrance end a socket having a profile corresponding to the end of the member 3, namely it comprises, starting from the entrance end, a cylindrical bearing face 12 adjoining a frustoconical bearing face 13, the inner end of the socket being terminated by a transverse face 14 perpendicular to the axis of the element 2. These two faces 12 and 13 correspond to the conjugate faces 4 and 5.

The entrance end of the member 11 has an outer chamber 15 adapted to bear against the face 10 of the member 3.

Externally, the member 11 has a frustoconical face 16 which terminates in the direction of the element 2 in an annular face or shoulder 17 constituting an abutment.

Mounted on the tubular element 2 before the end member 11 has been welded to the element 2, is a ring 18 constituting a counter-flange and having a cylindrical bore 19 whose diameter exceeds the outside diameter of the tube 2, there being provided adjoining the bore 19 a frustoconical bore 20 having the same taper as the face 16. These two faces 20 and 19 are interconnected by an annular face or shoulder 21 contained in a plane perpendicular to the axis of the ring element. Provided on the periphery of the ring 18 are apertures 22 in a number equal to the number of apertures 8, the centres of these apertures being located on a circle concentric with the axis of the ring.

The two pipe elements are joined in the following manner:

The elements 1 and 2 provided with their end members 3 and 11 are brought together and the end of the member 3 is inserted in the member 11, the bearing face 4 bearing against the face 12 so as to center the joint. The ring 18 is then moved toward the flange 7 in so positioning it that the apertures 22 are in alignment with the apertures 8. Screws 23 are inserted in the apertures 22 and manually screwed into the tapped apertures 8.

It will be observed that up to point the ring 18 is partially free to move in translation and still has slight play as concerns rotation so that it can be perfectly centered relative to the flange 7.

The screws are thereafter tightened with a spanner or key in tightening pairs of diametrally opposed screws in the form of a cross so as to obtain a balanced tightening as is conventional in flanged joints.

As the screws are tightened, the ring 18 is moved toward the flange 7 and this causes the members 3 and 11 to move toward each other, the same being true of the face 5 which bears against the face 13 and thus affords a sealed joint. In the course of this movement of approach, the cylindrical bearing faces 4 and 12 insure a precise centering of the faces 5 and 13 relative to each other. This movement of approach is limited by the abutment of the face 15 against the face 10 so that the insertion of the member 3 into the member 11 is limited and an excessive crushing of the faces 5 and 13 is avoided.

As the ring 18 moves toward the flange 7, a wedging occurs between the faces 16 and 20 and this renders the ring 18 rigidly connected to the end member 11. Owing to this rigid connection, the tube 2 is prevented from rotating with respect to the tube 1. It will be observed that this rigid connection only occurs in the course of tightening the joint, and this permits a good positioning in the course of this tightening.

In order to obtain a good wedging it is necessary that the taper of the faces 16 and 20 be sufficient to result in the wedging. It must not be too great so that the wedging action is maximum. Consequently, it is advantageously of the order of 10% which moreover is of the order of magnitude of Morse tapers employed for fitting tools into the spindles of machine tools.

Further, the abutment of the face 21 of the ring 18 against the face 17 also limits the tightening of the ring 18 onto the socket end of the member 11. Thus, it is possible to very precisely adjust the value of the tightening of the joint according to the invention without risk of excessive stresses being set up in the elements of the assembly, since, as soon as the abutments come in contact with each other the corresponding required screw tightening torque suddenly increases and indicates that the tightening of the joint is sufficient.

The joint according to the invention thus provides a sealed joint including a conical bearing face in a very simple manner (without need of complicated machining of screwthreads for bringing the ends to be assembled together) by means of a free joint tightening ring, a complete rigid interconnection of the two adjacent ends of the tubular elements being achieved. This rigid interconnection is two-fold. First, it precludes any possibility of rotation of one end with respect to the other when the joint has been achieved owing to the wedging of the ring 18 on the member 11. Secondly, owing to the centering afforded by the faces 4 and 12 and to the binding achieved by the tightening of the ring 18 onto the face 16 it offers a very special resistance to bending stresses since the faces 5 and 13 cannot slide with respect to each other.

Further, it will be observed that the binding of the outer face 16 of the member 11 helps to maintain an even closer application of the joint faces 5 and 13.

Although specific embodiments of the invention have been described, many modifications and changes may be made therein without departing from the scope of the invention as defined in the appended claims.

Thus, the hexagon-head screws 23 can be replaced by screws of the Allen type. The tapped apertures 8 could be blind apertures.

Further, when the pipe elements provided with this type of joint are intended to be immersed in a fluid capable of attacking the joint, such as sea water (in the case of pipes immersed to great depth) there could be provided between the various elements of the joint elastically yieldable seals of natural or synthetic rubber or the like, these seals being adapted to prevent the outside fluid from reaching the region of the faces 4, 12 and 5, 13.

Having now described my invention what I claim as new and desire to secure by Letters Patent is:

1. A flanged joint between two rigid pipe elements, said joint comprising in combination: a male end portion rigid with one of said pipe elements, a female end portion rigid with the other of said pipe elements and having an entrance end, said male portion having an outer cylindrical centering face and an outer frustoconical sealing face adjacent said centering face, and said female portion having an inner cylindrical centering face and an inner frustoconical sealing face adjacent said inner centering face, said inner and outer frustoconical faces being in sealing-tight contact and having the same taper, an outer flange rigid with said male portion and axially set back from the major part of said two adjacent outer faces, an outer frustoconical wedging face on said female portion and having a taper of substantially 10° included angle divergent towards said entrance end, a detachable ring engaged on said female portion and having a frustoconical inner wedging face having a taper which is identical to that of said outer wedging face and engaged on said outer wedging face with an interference fit, at least a portion of said interengaged wedging faces having substantially the same location axially of said joint and substantially the same axial extent as the combined inner and outer sealing and centering faces, and a plurality of screwthreaded members axially engaged with said ring and with said flange and axially maintaining through said ring said inner and outer wedging faces and said inner and outer sealing faces in close contact with each other.

2. A joint as claimed in claim 1, wherein one of said inner faces adjoins said entrance end of said female portion and said interengaged wedging faces extends substantially to said entrance end of said female portion.

3. A flanged joint as claimed in claim 2, wherein said inner centering face adjoins said entrance end of said female portion and said ring has a substantially cylindrical outer face which has substantially the same extent and location axially of said joint as said wedging faces.

4. A flanged joint as claimed in claim 2, comprising at said entrance end of said female end portion an outer annular chamfer which is in abutting relation to an annular recess in said flange having a shape which is the counterpart of the shape of said chamfer.

5. A flanged joint as claimed in claim 2, comprising an inner shoulder on said ring remote from and facing said entrance end of said female portion and an outer shoulder on said female portion remote from said entrance end and in abutting relation to said inner shoulder.

6. A flanged joint between two rigid pipe elements, said joint comprising in combination: a male end portion rigid with one of said pipe elements, a female end portion rigid with the other of said pipe elements and having an entrance end, said male and female portions having a pair of interengaged cylindrical centering faces and a pair of interengaged frustoconical sealing faces, said pair of cylindrical faces being adjacent said entrance end of said female portion, said sealing faces having an identical taper of substantially 10° included angle, an outer flange rigid with said male portion and axially adjacent said centering faces, an outer annular chamfer on said entrance end of said female portions, an annular frustoconical recess in said flange having a shape which is the counterpart of the shape of said chamfer and in abutting relation to said chamfer, a frustoconical outer wedging face on said female portion having a taper of substantially 10° included angle, said wedging face extending in a convergent manner from said chamfer axially beyond said sealing faces, an annular outer shoulder at the end of said wedging face remote from said chamfer, a detachable ring encompassing said female portion and having a frustoconical inner wedging face having the same taper as said outer wedging face and extending substantially from said chamfer axially beyond said sealing faces, an annular inner shoulder on said ring in abutting relation to said outer shoulder, a plurality of screw members freely extending through and axially abutting said ring and screw-threadedly engaged in said flange so as to clamp said shoulders and said chamfer and recess in abutting relation to each other to produce an interference fit between said wedging faces and maintain said sealing faces in liquid-tight contact with each other.

References Cited by the Examiner

UNITED STATES PATENTS

| Re. 23,137 | 7/1949 | Hobbs | 285—368 |
| 646,597 | 4/1900 | Bullock | 285—332 |
| 787,791 | 3/1905 | Reynolds | 285—368 |

FOREIGN PATENTS 526,694  3/1955  Italy.

CARL W. TOMLIN, *Primary Examiner.*

D. W. AROLA, *Assistant Examiner.*